US012338644B1

(12) United States Patent
Barbosa

(10) Patent No.: US 12,338,644 B1
(45) Date of Patent: Jun. 24, 2025

(54) APPARATUS FOR MOUNTING CELLULAR TOWER ON BILLBOARDS

(71) Applicant: Gary Barbosa, Palm Harbor, FL (US)

(72) Inventor: Gary Barbosa, Palm Harbor, FL (US)

( * ) Notice: Subject to any disclaimer, the term of this patent is extended or adjusted under 35 U.S.C. 154(b) by 148 days.

(21) Appl. No.: 18/391,832

(22) Filed: Dec. 21, 2023

(51) Int. Cl.
*E04H 12/22* (2006.01)
*E04H 12/08* (2006.01)
*G09F 15/00* (2006.01)

(52) U.S. Cl.
CPC ....... *E04H 12/2253* (2013.01); *E04H 12/085* (2013.01); *G09F 15/0037* (2013.01)

(58) Field of Classification Search
CPC ............ E04H 12/2253; E04H 12/2261; E04H 12/085; G09F 15/0037; H01Q 1/1242
See application file for complete search history.

(56) References Cited

U.S. PATENT DOCUMENTS 4,910,898 A * 3/1990 Hector ...................... E01F 9/65 40/602
4,910,940 A * 3/1990 Grady, II .................. E04B 5/08 52/223.5
5,787,673 A * 8/1998 Noble .................. E04H 12/085 52/114
7,004,683 B1 * 2/2006 Rupiper .................... E02D 5/56 52/165
2009/0217618 A1 * 9/2009 Cook .................. E04H 12/2261 403/387
2014/0115978 A1 * 5/2014 Fairbairn ................. H01Q 1/12 52/298
2018/0062247 A1 * 3/2018 Umbert ................... G09F 23/00
2021/0104807 A1 * 4/2021 Patel ........................ H01Q 1/20

FOREIGN PATENT DOCUMENTS

JP 4301973 B2 * 7/2009 ........... E04H 12/085

* cited by examiner

*Primary Examiner* — Christine T Cajilig
(74) *Attorney, Agent, or Firm* — Law Office of Vincent LoTempio, PLLC; Vincent G. LoTempio; Robert L. Cerasa

(57) ABSTRACT

Disclosed herein is a connection cradle that is assembled for mounting a cellular tower on a billboard having a vertical support column and a horizontal torsion bar supporting the billboard's signage. The cradle includes a bottom flange having tubes extending axially outwards from an annular rim of the bottom flange having components that are bolted to create the annular rim that is affixed to the vertical support column along the outer cross-section using gussets welded to the vertical support column to attach the bottom flange therewith. A top flange having hollow tubes extending axially outwards from the annular rim, where each of the hollow tubes accommodate the tubes of the bottom flange. A housing having annular components, welded together to create a cylindrical housing that circumscribes the assembled cradle. The cellular tower is mounted on the billboard by placing the vertical support column inside the billboard and atop the cradle.

14 Claims, 10 Drawing Sheets

APPARATUS FOR MOUNTING CELLULAR TOWER ON BILLBOARDS

FIELD OF THE INVENTION

The present invention relates generally to apparatus for mounting cellular towers on billboards and more specifically, to a connection cradle that enables mounting of cellular towers on billboards.

BACKGROUND OF INVENTION

Billboards are structures that are used to display various messages by means of text and graphics, and/or a multimedia content that combines the texts and graphics. Typically, the billboards are massive structures aimed at displaying content to onlookers from a far-off distance. Consequently, for greater visibility, billboards are placed at a height. As a result of this, the real-estate and the structural components required for erecting a billboard are massive.

Cellular towers on the other hand are also required to be placed at heights to increase the reach of the radio connectivity provided by the towers. As a result, the structures required for erecting the cellular towers are also massive and need significant investment in structure and ground space required for erecting a cellular tower.

Therefore, there is significant convergence in the structural pre-requisites of a billboard and a cellular tower. However, in cellular towers that exist today, real-estate is being wasted as there is no solution that leverages the structural elements of a billboard to address the pre-requisites of erecting cellular towers.

Therefore, in order to address the inefficiencies that exist with respect to space utilization, there is a need for co-locating the billboard and the cellular tower by use of a mechanism that enables mounting of cellular towers on billboards.

SUMMARY

According to embodiments illustrated herein, there may be provided an apparatus for mounting cellular tower on a billboard. The apparatus includes a connection cradle comprising a plurality of components that may be assembled for mounting a cellular tower on a billboard by extending the underground vertical foundation and base of the billboard around the billboards horizontal torsion bar used for displaying signage. The connection cradle includes a bottom flange which is welded to the vertical support column of the billboard using numerous gussets to connect the bottom flange to the vertical support column. The bottom flange has a plurality of tubes extending axially outwards from an annular rim of the bottom flange. The bottom flange includes a plurality of components that may be bolted to create the annular rim that may be affixed to the billboard's vertical support column along the outer cross-section of the vertical support column. The connection cradle further includes a top flange having a plurality of hollow tubes extending axially outwards from the annular rim of the top flange. Each of the plurality of hollow tubes may be configured to telescopically accommodate the plurality of tubes of the bottom flange for assembling the connection cradle. Threaded rods inside the hollow tubes bolted together compress the top flange to the bottom flange. The hollow tubes are then welded to the top side of the bottom flange and the bottom side of the top flange. The connection cradle further includes a housing having a plurality of annular components that may be welded together to create a cylindrical housing that circumscribes and reinforces the assembled connection cradle. The connection cradle allows the horizontal torsion bar supporting the billboard's signage to pass through it and extends the base of the billboard above the horizontal torsion bar for the mounting of a cellular tower. The cellular tower may be mounted on the billboard by bolting the vertical support column of the cellular tower to the top flange of the assembled connection cradle.

According to embodiments illustrated herein, there may be provided a method of mounting a cellular tower on a billboard. The method includes assembling a plurality of components of a connection cradle. The method further includes mounting the assembled connection cradle on the billboard encompassing the billboard's vertical support column and the billboard's horizontal torsion bar mounted thereon. The cellular tower may be mounted to the connection cradle, superior to the junction of the billboard's vertical support column and the billboard's horizontal torsion bar.

DRAWINGS

The invention will now be described, by way of example, with reference to the accompanying drawings, in which.

Like reference numerals refer to like parts throughout the various views of the drawings.

DETAILED DESCRIPTION OF THE INVENTION

Figure 1:
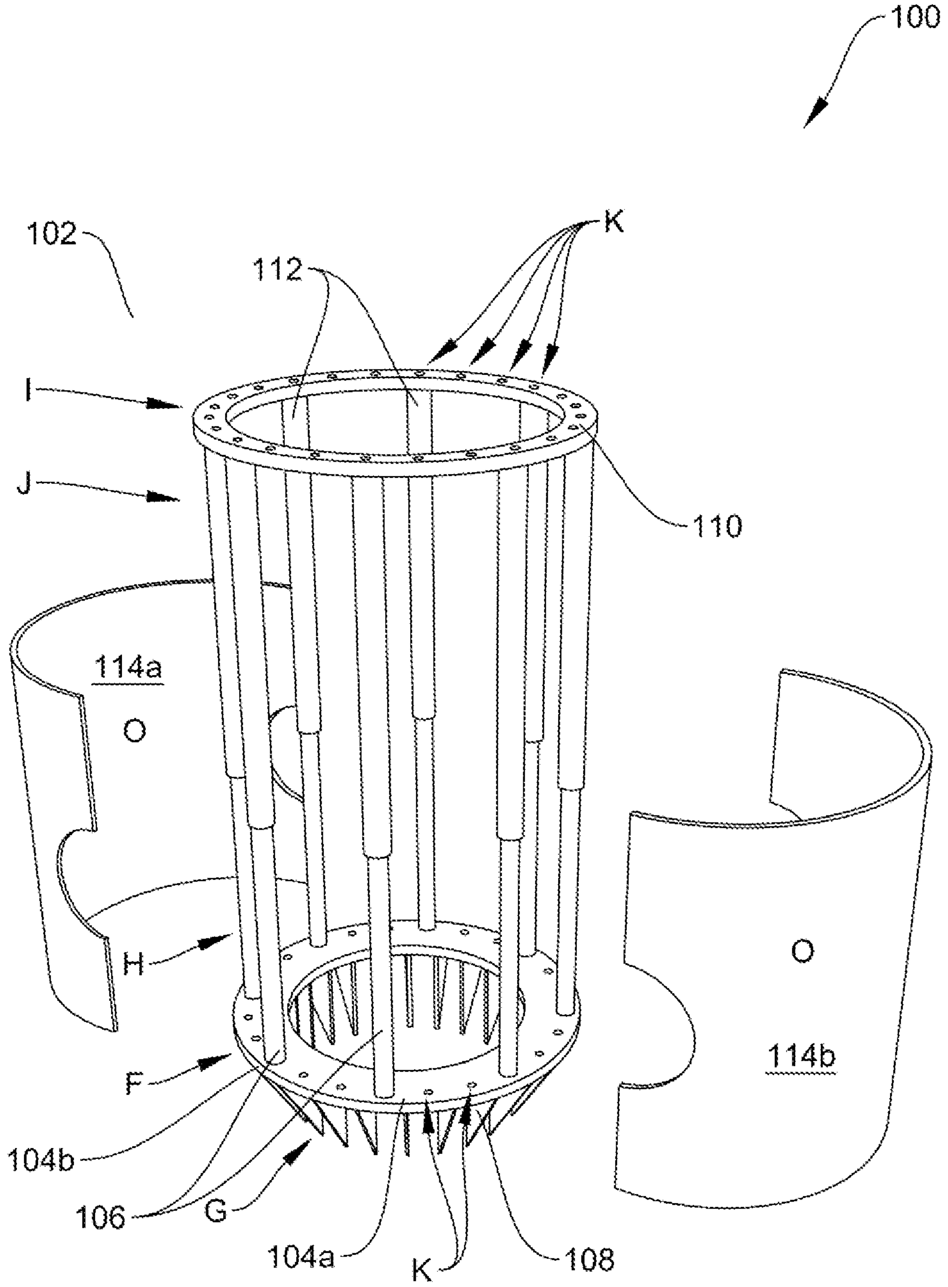
FIG. 1 illustrates an isometric view of an exemplary apparatus for mounting cellular tower on a billboard, in accordance with an embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations.

The present disclosure may be best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.

All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

At the outset, it should be clearly understood that like reference numerals are intended to identify the same structural elements, portions, or surfaces consistently throughout the several drawing figures, as may be further described or explained by the entire written specification of which this detailed description is an integral part. The drawings are intended to be read together with the specification and are to be construed as a portion of the entire "written description" of this invention as required by 35 U.S.C. § 112.

Various implementations may be found in an apparatus for mounting a cellular tower on billboards of different configurations. The apparatus includes a connection cradle comprising a plurality of components that may be assembled for mounting the cellular tower on the billboard comprising a vertical support column and a horizontal torsion bar mounted thereon. In an embodiment, the billboard structure comprises a shape wherein one or more signs may be arranged in a V-shape, a triangular shape, and parallel to with respect to each other.

The connection cradle includes a bottom flange having a plurality of tubes extending axially outwards from an annular rim of the bottom flange. The bottom flange includes a plurality of components that may be bolted to create the annular rim that may be affixed to the billboard's vertical support column along the outer cross-section of the vertical support column. The bottom flange further includes gussets welded to the vertical support column for supporting the bottom flange in a horizontal position.

The connection cradle further includes a top flange having a plurality of hollow tubes extending axially outwards from the annular rim of the top flange. Each of the plurality of hollow tubes may be configured to telescopically accommodate the plurality of tubes of the bottom flange for assembling the connection cradle. In an embodiment, once the plurality of tubes of the bottom flange are accommodated, the portion of the plurality of tubes extending to the top flange are bolted through the top and bottom flanges using threaded rods inside the plurality of tubes. In an embodiment, the plurality of hollow tubes are spaced on the rim to allow the billboard's horizontal torsion bar supporting the billboard signage to pass through a space between the plurality of hollow tubes.

The connection cradle further includes a housing having a plurality of annular components that may be welded together to create a cylindrical housing that circumscribes and reinforces the assembled connection cradle. In an embodiment, the annular components of the housing when welded together may be configured to allow the billboard's horizontal torsion bar to pass through the welded housing in a direction that is perpendicular to the axis of the housing.

The cellular tower may be mounted on the billboard by bolting the vertical support column of the cellular tower to the top of the assembled connection cradle. The bottom end of the vertical support column of the cellular tower may be placed proximally with respect to the top flange. Further, the cellular tower may be mounted atop the connection cradle and inside the billboard structure.

In another implementation, there may be provided a method of mounting cellular tower on a billboard. The method includes assembling a plurality of components of a connection cradle. The method further includes mounting the assembled connection cradle on the billboard includes a vertical support column and a horizontal torsion bar mounted thereon. The connection cradle may be mounted at a junction at which the billboard's vertical support column and the billboard's horizontal torsion bar may be joined. The connection cradle includes a bottom flange having a plurality of tubes extending axially outwards from an annular rim of the bottom flange. The bottom flange includes a plurality of components that may be bolted to create the annular rim that may be affixed to the bottom flange which is welded using numerous gussets to the billboard's vertical support column. The connection cradle includes a top flange having a plurality of hollow tubes extending axially outwards from the annular rim of the top flange. Each of the plurality of hollow tubes may be configured to telescopically accommodate the plurality of tubes of the bottom flange for assembling the connection cradle. The connection cradle further includes a housing having a plurality of annular components that may be welded together to create a cylindrical housing that circumscribes and reinforces the assembled connection cradle. The method further includes mounting the cellular tower on the billboard by bolting it to the top of the assembled connection cradle.

FIG. 1 illustrates an isometric view of an exemplary apparatus for mounting cellular tower on a billboard, in accordance with an embodiment of the present invention.

With reference to FIG. 1, there is shown an isometric view 100 of a connection cradle 102. The connection cradle 102 may be used for mounting a cellular tower on a billboard. An example connection cradle 102 may include a plurality of components that are assembled for mounting the cellular tower on the billboard. The billboard may include a vertical support column and a horizontal torsion bar mounted thereon.

The plurality of components of the connection cradle 102 may include a bottom flange 104. The bottom flange may include a plurality of components 104*a* and 104*b*. The bottom flange 104 may further include a plurality of tubes 106 extending axially outwards from each of the plurality of components 104*a* and 104*b*.

The plurality of components of the connection cradle 102 may further include numerous gussets 108 welded to the billboard's vertical support column and a top flange 110. The top flange 110 may include a plurality of hollow tubes 112 extending axially outwards from the annular rim of the top flange 110. The plurality of components of the connection cradle 102 may further include a housing 114. In an embodiment, the housing 114 may include a plurality of annular components 114*a* and 114*b* that when welded together, create a cylindrical housing that circumscribes and reinforces the assembled connection cradle 102.

Figure 2:
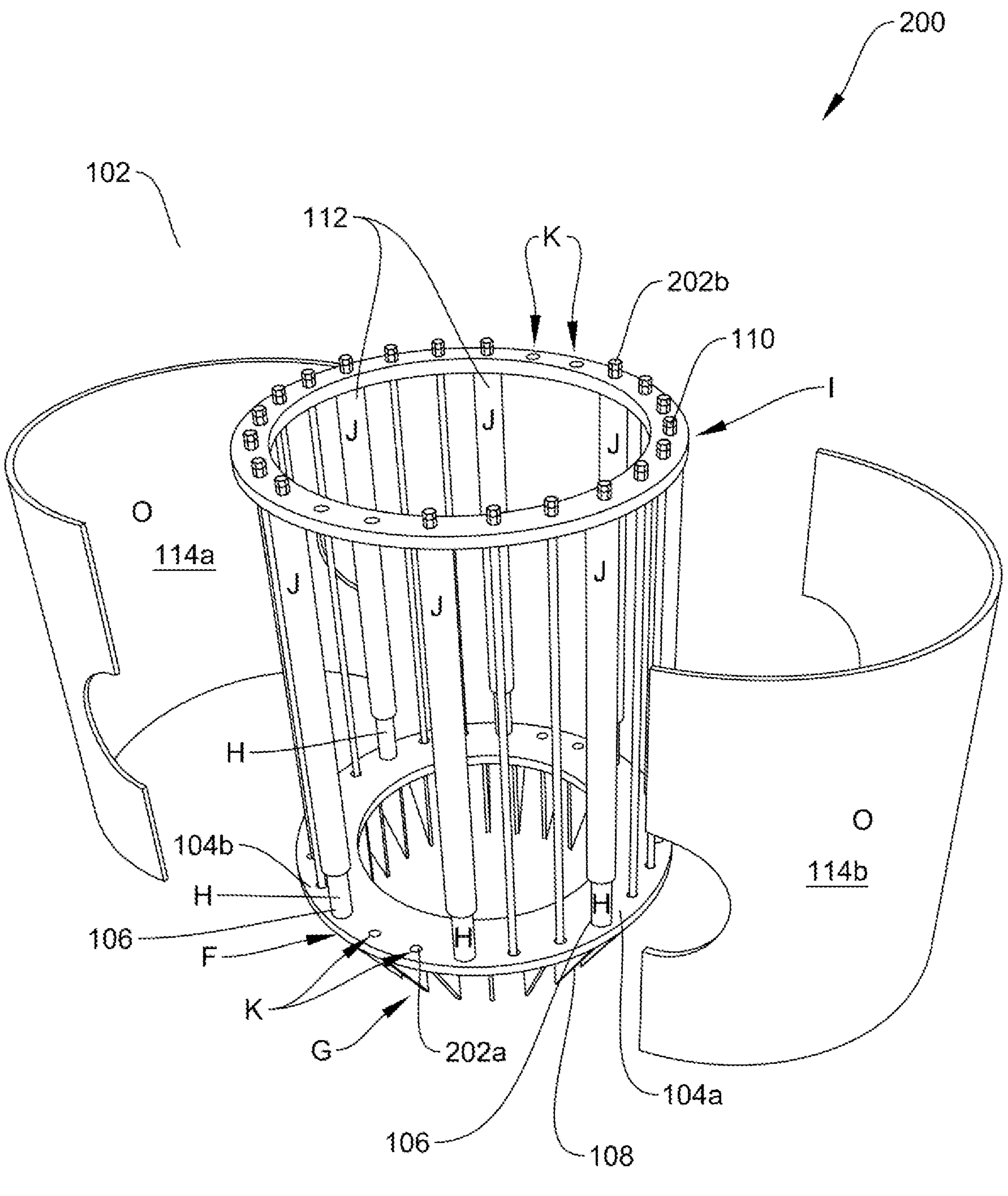
FIG. 2 illustrates an isometric view of an exemplary apparatus for mounting cellular tower on a billboard having the top flange and the bottom flange in an assembled state, in accordance with an embodiment of the present invention.

FIG. 2 illustrates an isometric view of an exemplary apparatus for mounting cellular tower on a billboard having the top flange and the bottom flange in an assembled state, in accordance with an embodiment of the present invention. Elements of FIG. 2 have been explained in conjunction with the elements of FIG. 1.

As is depicted in FIG. 2, the plurality of components 104*a* and 104*b* of the bottom flange 104 are depicted in an attached state. The attachment of the plurality of components 104*a* and 104*b* is enabled by a plurality of bolts 202*a*. Once attached with each other, the plurality of components 104*a* and 104*b* create a structure that is in shape of an annular rim.

Once the rim of the bottom flange 104 is assembled, the plurality of tubes 106 of the bottom flange 104 are slid into the plurality of hollow tubes 112 of the top flange 110. Each of the plurality of hollow tubes 112 are configured to telescopically accommodate the plurality of tubes 106 of the bottom flange 104 for assembling the connection cradle 102. Once slid into the plurality of tubes 106, the portion of the plurality of hollow tubes 112 that protrudes beyond the rim of the top flange 110 may be bolted to the top flange 110 using the threads present on threaded rods inside the plurality of tubes 106 using the bolts 202*b*. In an embodiment, the threads may be present only on a portion of the plurality of tubes 106. In another embodiment, the threads may be present throughout the length of the plurality of tubes 106.

Once the bottom flange 104 and the top flange 110 are assembled together, the plurality of annular components 114*a* and 114*b* of the housing 114 may be welded together to create a cylindrical housing that circumscribes and reinforces the assembled connection cradle. The plurality of annular components 114*a* and 114*b* of the housing 114, when welded together may be configured to allow the horizontal torsion bar to pass through the welded housing 114 in a direction that is perpendicular to the axis of the housing 114. This may be realized by having a notch that may be present on each of the plurality of annular components 114*a* and 114*b*. When welded together, the joined notches of the plurality of annular components 114*a* and 114*b* create an opening through which a horizontal torsion bar of a billboard may pass in a direction that is perpendicular to the axis of the vertical support column created by welding the plurality of annular components 114*a* and 114*b* together.

Figure 3:
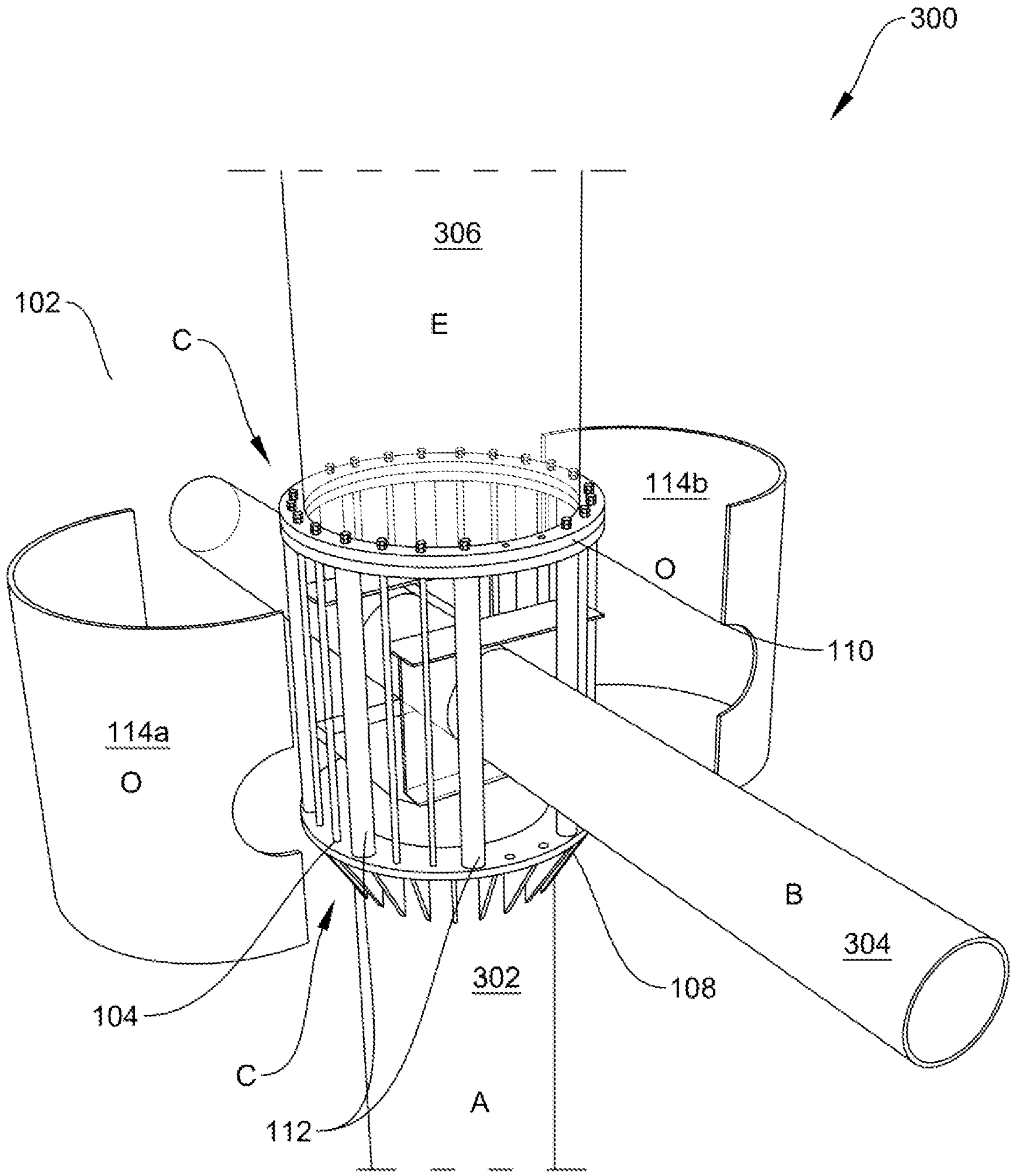
FIG. 3 illustrates an isometric view of placement of a plurality of components of the connection cradle with respect to the structure of a billboard, for mounting cellular tower on the billboard, in accordance with an embodiment of the present invention.

FIG. 3 illustrates an isometric view of placement of a plurality of components of the connection cradle with respect to the structure of a billboard, for mounting cellular tower on the billboard, in accordance with an embodiment of the present invention. Elements of FIG. 3 have been explained in conjunction with the elements of FIGS. 1 and 2.

With reference to FIG. 3, there is shown the isometric view 300 of placement of a plurality of components of the connection cradle with respect to the structure of a billboard. The structure of the billboard includes a vertical support column 306 and a horizontal torsion bar 304 mounted on the vertical support column 306. In an embodiment, the billboard structure comprises a shape wherein one or more signs are arranged in a V-shape, a triangular shape, and parallel to with respect to each other.

As discussed above, the connection cradle 102 includes a bottom flange 104 having a plurality of tubes 106 extending axially outwards from an annular rim of the bottom flange 104. The bottom flange 104 includes a plurality of components 104*a* and 104*b* that may be bolted to create the annular rim that may be affixed to the vertical support column 306 along the outer cross-section of the vertical support column 306. The bottom flange 104 further includes numerous gussets 108 for supporting the bottom flange 104 in a horizontal position.

The connection cradle 102 further includes a top flange 110 having a plurality of hollow tubes 112 extending axially outwards from the annular rim of the top flange 110. Each of the plurality of hollow tubes 112 may be configured to telescopically accommodate the plurality of tubes 106 of the bottom flange 104 for assembling the connection cradle. In an embodiment, once the plurality of tubes 106 are accommodated, the portion of the plurality of tubes 106 extending to the bottom flange 104 may be bolted to the top flange 110 and the bottom flanges 104 using the threaded rods that pass through the plurality of tubes 106 of both the top flange 110 and the bottom flange 104. In an embodiment, the plurality of hollow tubes 112 and the plurality of tubes 106 may be spaced on the respective annular rims to allow the horizontal torsion bar 304 supporting the billboard signage to pass through a space between the tubes.

The connection cradle 102 further includes the housing 114 having the plurality of annular components 114*a* and 114*b*. The plurality of components 114*a* and 114*b* may be welded together to create a cylindrical housing that circumscribes the assembled connection cradle 102. In an embodiment, the plurality of annular components 114*a* and 114*b*, when welded together may be configured to allow the horizontal torsion bar 304 to pass through the welded housing 114 in a direction that is perpendicular to the axis of the housing 114.

Once the plurality of components of the connection cradle 102 are assembled, a vertical support column 306 used for supporting the cellular tower may be mounted on the billboard. The vertical support column 306 may be mounted by placing the vertical support column 306 atop the assembled connection cradle 102, which is inside the billboard structure. The bottom end of the cellular vertical support column 306 may be placed proximally with respect to the top flange 110. Further, the cellular tower may be mounted atop and inside of the billboard structure.

Figure 4:
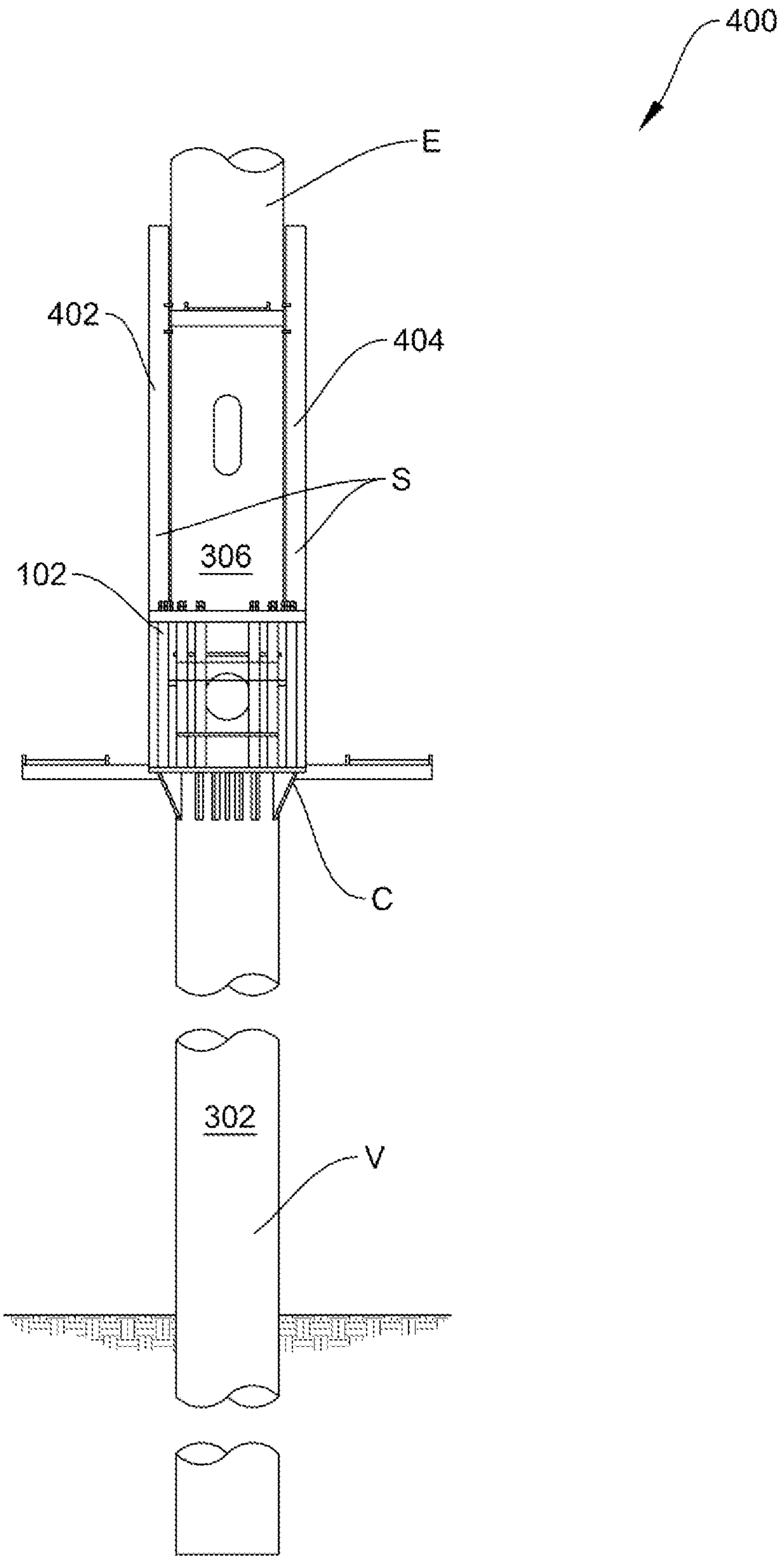
FIG. 4 illustrates a side elevation view of an exemplary connection cradle in an assembled state, used for mounting a cellular tower on a billboard, in accordance with an embodiment of the present invention.

FIG. 4 illustrates a side elevation view of an exemplary connection cradle in an assembled state, used for mounting a cellular tower on a billboard, in accordance with an embodiment of the present invention. Elements of FIG. 4 have been explained in conjunction with the elements of FIGS. 1 to 3.

With reference to FIG. 4, the side elevation view 400 depicts the sign faces 402 and 404 mounted on the billboard structure 302. The side elevation view 400 further depicts the connection cradle 102 in an assembled state and mounted on the structure of the billboard structure 302. The connection cradle 102 in the assembled state supports the vertical support column 306 of the cellular tower. Notwithstanding, the disclosure may not be limited to mounting of a single connection cradle 102 on the structure of the billboard. More than one connection cradle 102 may be assembled and mounted to enable mounting of a plurality of cellular towers on the billboard structure 302.

Figure 5:
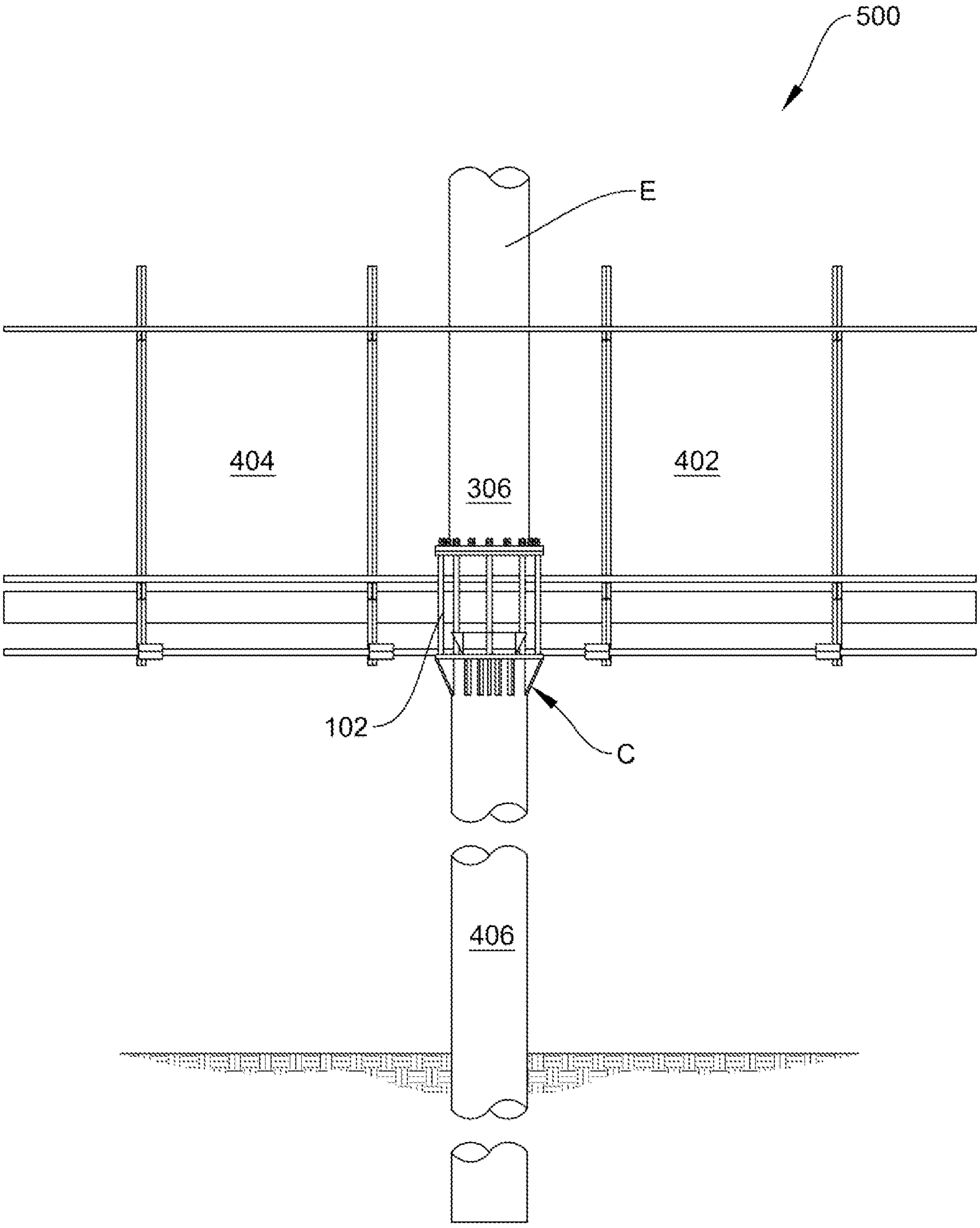
FIG. 5 illustrates a front elevation view of an exemplary connection cradle in an assembled state, used for mounting a cellular tower on a "center mount" billboard, in accordance with an embodiment of the present invention.

FIG. 5 illustrates a front elevation view of an exemplary connection cradle in an assembled state, used for mounting a cellular tower on a "center mount" billboard, in accordance with an embodiment of the present invention. Elements of FIG. 5 have been explained in conjunction with the elements of FIGS. 1 to 4.

With reference to FIG. 5, the side elevation view 500 depicts the sign faces 402 and 404 mounted on the billboard structure 406. The front elevation view 500 further depicts the connection cradle 102 in an assembled state and mounted on the structure of a center mount billboard structure 406. The connection cradle 102 in the assembled state supports the vertical support column 306 of the cellular tower.

Figure 6:
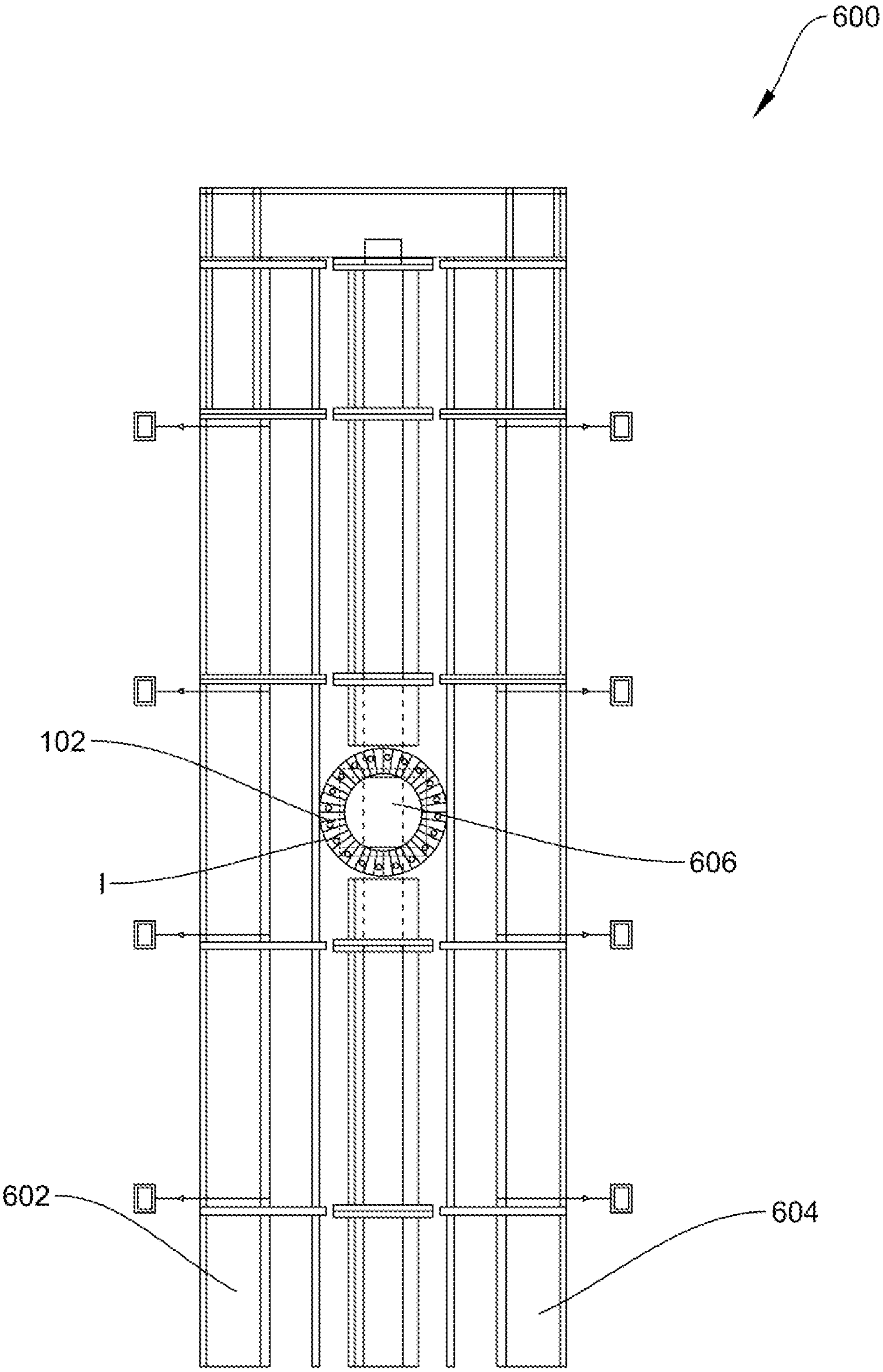
FIG. 6 illustrates a plan view of an exemplary connection cradle in an assembled state, used for mounting a cellular tower on a "center mount" billboard, in accordance with an embodiment of the present invention.

FIG. 6 illustrates a plan view of an exemplary connection cradle in an assembled state, used for mounting a cellular tower on a "center mount" billboard, in accordance with an embodiment of the present invention. Elements of FIG. 6 have been explained in conjunction with the elements of FIGS. 1 to 5.

With reference to FIG. 6, the plan view 600 depicts the sign faces 602 and 604 mounted on the billboard structure 606. The plan view 600 further depicts the connection cradle 102 in an assembled state and mounted on the structure of the billboard structure 606, between the sign faces 602 and 604.

Figure 7:
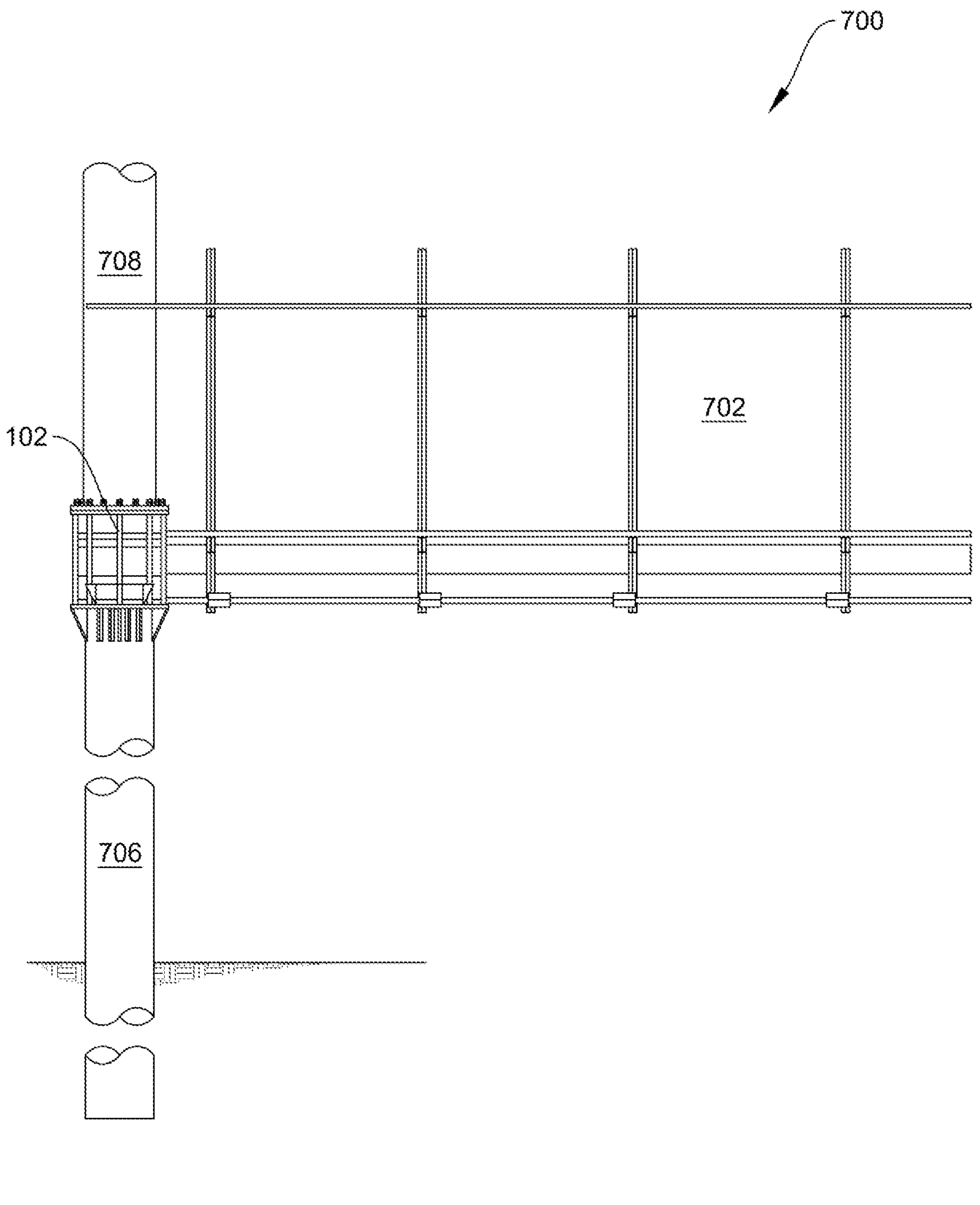
FIG. 7 illustrates a front elevation view of an exemplary connection cradle in an assembled state, used for mounting a cellular tower on a "full flag" billboard having sign faces arranged in V-shape, in accordance with an embodiment of the present invention.

FIG. 7 illustrates a front elevation view of an exemplary connection cradle 102 in an assembled state, used for mounting a cellular tower 708 on a "full flag" billboard 706 having sign faces 702 arranged in V-shape, in accordance with an embodiment of the present invention. Elements of FIG. 7 have been explained in conjunction with the elements of FIGS. 1 to 6.

With reference to FIG. 7, the side elevation view 700 depicts the sign faces 702 (second face not shown) mounted on the billboard structure 706. The front elevation view 700 further depicts the connection cradle 102 in an assembled state and mounted on the structure of the billboard structure 706. The connection cradle 102 in the assembled state supports the vertical support column 708 of the cellular tower.

Figure 8:
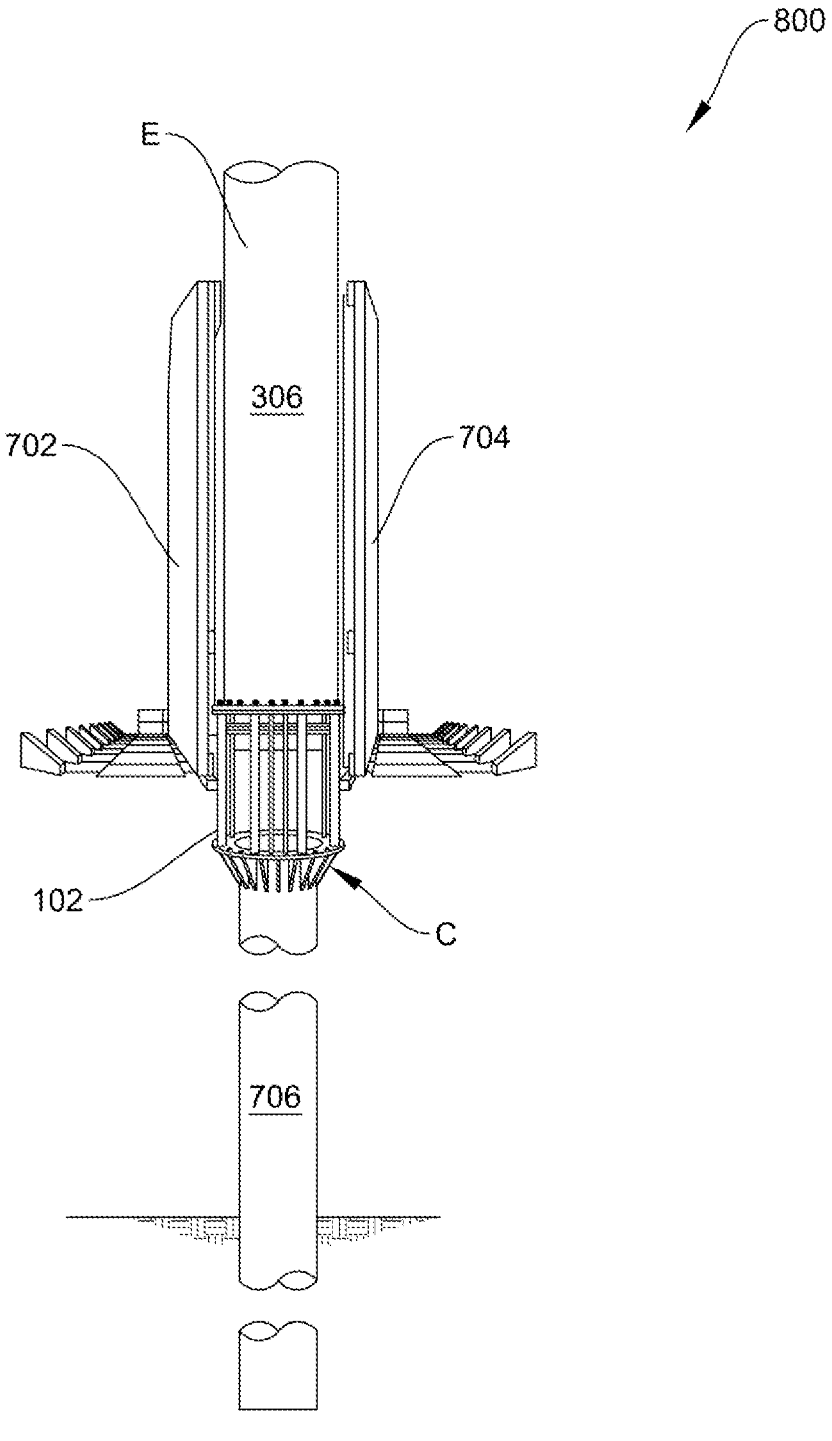
FIG. 8 illustrates a side elevation view of an exemplary connection cradle in an assembled state, used for mounting a cellular tower on a "full flag" billboard having sign faces arranged in V-shape, in accordance with an embodiment of the present invention.

FIG. 8 illustrates a side elevation view of an exemplary connection cradle in an assembled state, used for mounting a cellular tower on a "full flag" billboard having sign faces arranged in V-shape, in accordance with an embodiment of the present invention. Elements of FIG. 8 have been explained in conjunction with the elements of FIGS. 1 to 7.

With reference to FIG. 8, the side elevation view 800 depicts the sign faces 702 and 704 mounted on the billboard structure 706. The side elevation view 800 further depicts the connection cradle 102 in an assembled state and mounted on the structure of the billboard structure 706. The connection cradle 102 in the assembled state supports the vertical support column 306 of the cellular tower. Notwithstanding, the disclosure may not be limited to mounting of a single connection cradle 102 on the structure of the billboard. More than one connection cradle 102 may be assembled and mounted on the billboard structure 706 to enable mounting of a plurality of cellular towers on the billboard structure 706, without limiting the scope of the disclosure.

Figure 9:
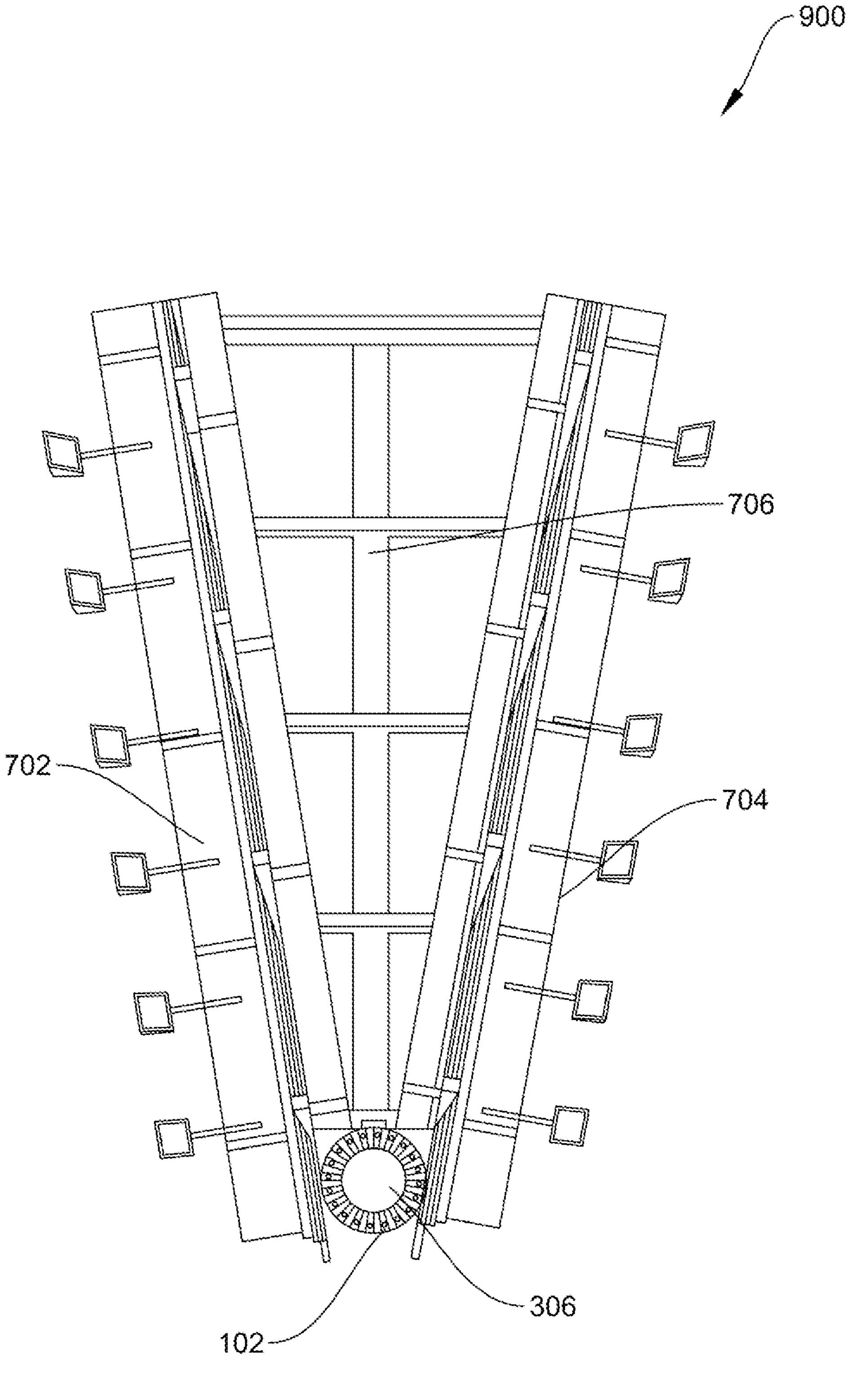
FIG. 9 illustrates a plan view of an exemplary connection cradle in an assembled state, used for mounting a cellular tower on a "full flag" billboard having sign faces arranged in V-shape, in accordance with an embodiment of the present invention.

FIG. 9 illustrates a plan view of an exemplary connection cradle in an assembled state, used for mounting a cellular tower on a "full flag" billboard having sign faces arranged in V-shape, in accordance with an embodiment of the present invention. Elements of FIG. 9 have been explained in conjunction with the elements of FIGS. 1 to 8.

With reference to FIG. 9, the side elevation view 900 depicts the sign faces 702 and 704 mounted on the billboard structure 706. The plan view 900 further depicts the connection cradle 102 in an assembled state and mounted on the structure of the billboard structure 706. The connection cradle 102 in the assembled state supports the vertical support column 306 of the cellular tower.

Figure 10:
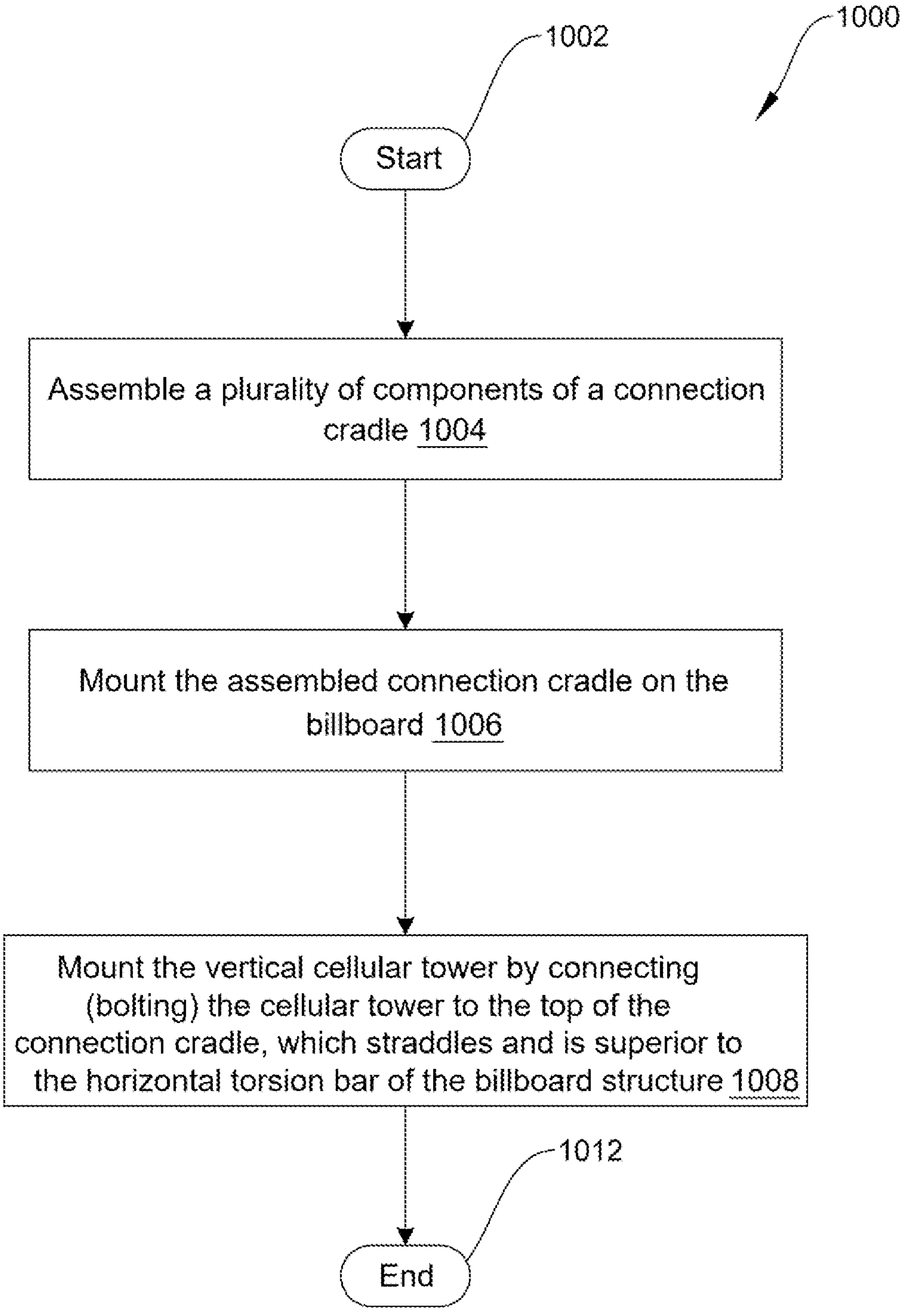
FIG. 10 illustrates a flowchart for a method of mounting cellular tower on a billboard, in accordance with an embodiment of the present invention.

FIG. 10 illustrates a flowchart for a method of mounting cellular tower on a billboard, in accordance with an embodiment of the present invention. The method starts at step 1002 and proceeds to step 1012.

At step 1004, a plurality of components of a connection cradle may be assembled. At step 1006, the assembled connection cradle may be mounted on the billboard. In an embodiment, the billboard includes a vertical support column and a horizontal torsion bar mounted thereon. The connection cradle may be mounted on at a junction at which the vertical support column and the horizontal torsion bar are joined. The connection cradle includes a bottom flange having a plurality of tubes extending axially outwards from an annular rim of the bottom flange. The bottom flange includes a plurality of components that are bolted to create the annular rim that is affixed to the billboard's vertical support column using numerous gussets along the outer cross-section of the billboard's vertical support column. The gussets enable the bottom flange to be supported in a horizontal position. The connection cradle includes a top flange having a plurality of hollow tubes extending axially outwards from the annular rim of the top flange. Each of the plurality of hollow tubes may be configured to telescopically accommodate the plurality of tubes of the bottom flange for assembling the connection cradle. The connection cradle further includes a housing having a plurality of annular components that are welded together to create a cylindrical housing that circumscribes and reinforces the assembled connection cradle.

At step 1008, the cellular tower may be mounted on the billboard by placing the vertical support column of the cellular tower co-axially inside the assembled billboard and atop the connection cradle. Control passes to end step 1010.

Advantages

The disclosed connection cradle enables a cellular tower to be mounted atop and inside of an existing billboard structure. By utilizing the real-estate available for billboards, the disclosed connection cradle decreases the footprint necessary for a typical cellular tower installation. This disclosed connection cradle enables connecting two vertical structures (of any shape and configuration) around an intervening horizontal structure (of any shape and configuration). By robustly securing the structure of the billboard with that of the cellular tower, the disclosed connection cradle enables the bolting of a high cellular towers to the top of the billboards. Further, the connection cradle enables mounting of a plurality of cellular towers on a single billboard structure.

Although the process-flow diagrams show a specific order of executing the process steps, the order of executing the steps may be changed relative to the order shown in certain embodiments. Also, two or more blocks shown in succession may be executed concurrently or with partial concurrence in some embodiments. Certain steps may also be omitted from the process-flow diagrams for the sake of brevity. In some embodiments, some or all the process steps shown in the process-flow diagrams can be combined into a single process.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like. The claims can encompass embodiments for hardware and software, or a combination thereof.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. An apparatus for mounting cellular tower on a billboard, the apparatus comprising:

a connection cradle comprising a plurality of components that are assembled for mounting a cellular tower on a billboard composed of a vertical support column having a top end and a bottom end and a horizontal torsion bar mounted thereon, the connection cradle comprising:

a bottom flange having a plurality of tubes extending axially outwards from an annular rim of the bottom flange, wherein the bottom flange comprises:

a plurality of components that are bolted to create the annular rim that is affixed to the billboard's vertical support column along the outer cross-section of the vertical support column; and numerous gussets attached to the billboard's vertical support column supporting the bottom flange in a horizontal position;

a top flange having an annular rim and a plurality of hollow tubes extending axially outwards from the annular rim of the top flange, wherein each of the plurality of hollow tubes are configured to telescopically accommodate the plurality of tubes of the bottom flange for assembling the connection cradle; and a housing comprising a plurality of annular components that are welded together to create a cylindrical housing that circumscribes and reinforces the assembled connection cradle, wherein the cellular tower is mounted on the billboard by placing the vertical support column of the billboard co-axially inside the assembled connection cradle.

2. The apparatus as claimed in claim 1, wherein the plurality of hollow tubes extending axially outwards from the annular rim of the top flange are spaced on the rim to allow the horizontal torsion bar supporting the billboard's signage to pass through.

3. The apparatus as claimed in claim 1, wherein the plurality of annular components of the housing when welded together are configured to allow the horizontal torsion bar to pass through the welded housing in a direction that is perpendicular to the axis of the housing.

4. The apparatus as claimed in claim 1, wherein once the plurality of tubes of the top and the bottom flanges are accommodated, the portion of the plurality of tubes extending to the bottom and top flanges are bolted to the flanges using threaded rods that pass through the plurality of tubes of both the top and bottom flanges.

5. The apparatus as claimed in claim 1, wherein the bottom end of the vertical support column of the cellular tower is placed proximally with respect to the top flange.

6. The apparatus as claimed in claim 1, wherein the cellular tower is mounted atop and inside of the billboard.

7. The apparatus as claimed in claim 1, wherein the billboard comprises a shape wherein one or more signs are arranged in a V-shape, a triangular shape, and parallel to with respect to each other.

8. A method of mounting cellular tower on a billboard, the method comprising:

assembling a plurality of components of a connection cradle;

mounting the assembled connection cradle on the billboard comprising a vertical support column having a top end and a bottom end and a horizontal torsion bar mounted thereon, wherein the connection cradle is mounted at a junction at which the vertical support column and the horizontal torsion bar are joined, wherein the connection cradle comprises:

a bottom flange having a plurality of tubes extending axially outwards from an annular rim of the bottom flange, wherein the bottom flange comprises:

the plurality of components that are bolted to create the annular rim that is affixed to the billboard's vertical support column along the outer cross-section of the vertical support column; and numerous gussets welded to the vertical support column for supporting the bottom flange in a horizontal position;

a top flange having an annular rim and a plurality of hollow tubes extending axially outwards from the annular rim of the top flange, wherein each of the plurality of hollow tubes are configured to telescopically accommodate the plurality of tubes of the bottom flange for assembling the connection cradle; and a housing comprising a plurality of annular components that are welded together to create a cylindrical housing that circumscribes and reinforces the assembled connection cradle; and mounting the cellular tower on the billboard by placing the vertical support column of the billboard atop the connection cradle.

9. The method as claimed in claim 8, wherein the plurality of hollow tubes extending axially outwards from the annular rim of the top flange are spaced on the rim to allow the horizontal torsion bar supporting the billboard to pass through.

10. The method as claimed in claim 8, wherein the plurality of annular components of the housing when welded together are configured to allow the horizontal torsion bar supporting the billboard signage to pass through the welded housing in a direction that is perpendicular to the axis of the housing.

11. The method as claimed in claim 8, wherein once the plurality of tubes of the top and the bottom flanges are accommodated, the portion of the plurality of tubes extending to the bottom and the top flanges are bolted to the top flange and the bottom flanges using the threaded rods that pass through the plurality of tubes of the top and the bottom flanges.

12. The method as claimed in claim 8, wherein the bottom end of the vertical support column of the cellular tower is placed proximally with respect to the top flange.

13. The method as claimed in claim 8, wherein the cellular tower is mounted atop the connection cradle and inside of the billboard.

14. The method as claimed in claim 8, wherein the billboard comprises a shape wherein one or more signs are arranged in a V-shape, a triangular shape, and parallel to with respect to each other.

* * * * *